United States Patent [19]

Lieckfeldt

[11] 4,094,595
[45] June 13, 1978

[54] CONTROL MECHANISM FOR THE PULL-DOWN PAWL OF A FILM PROJECTOR

[75] Inventor: Hans Lieckfeldt, Stuttgart, Germany

[73] Assignee: Robert Bosch GmbH, Stuttgart, Germany

[21] Appl. No.: 758,544

[22] Filed: Jan. 11, 1977

[30] Foreign Application Priority Data

Jan. 16, 1976 Germany .............................. 2601503

[51] Int. Cl.² .............................................. G03B 21/48
[52] U.S. Cl. ................................... 352/180; 352/194; 226/62
[58] Field of Search ............... 352/180, 191, 192, 193, 352/194, 195, 196; 226/62

[56] References Cited

U.S. PATENT DOCUMENTS

| | | | |
|---|---|---|---|
| 3,181,174 | 4/1965 | Griffioen | 352/180 |
| 3,402,007 | 9/1968 | Gerlach | 352/180 |
| 3,502,403 | 3/1970 | Riedel | 352/180 |
| 3,536,389 | 10/1970 | Reinsch | 352/180 |
| 3,984,181 | 10/1976 | Nowak | 352/180 |

*Primary Examiner*—Monroe H. Hayes
*Attorney, Agent, or Firm*—Michael J. Striker

[57] ABSTRACT

A control mechanism for the pull-down pawl of a projector, for the projection of films with different frame frequencies, comprises a pot-shaped worm gear and a control drum coaxial with and connected thereto for rotation therewith, movable in axial direction relative thereto and arrestable against a force of biasing means in one of a plurality of selected positions. The control drum is provided on its periphery with a plurality of different cam curves and a pin, movable in a direction normal to the axis of the control drum, engages with one a cam curve, brought in a selected position of the drum in alignment therewith, while the other end of the pin cooperates with a pull-down pawl to move an end of the latter into and out of perforations of the film. The worm gear meshes with a worm driven by a shaft carrying a cam engaged by a cam follower connected to the pull-down pawl to move the latter along a feed stroke when the end of the pull-down pawl is engaged in one of the film perforations.

12 Claims, 3 Drawing Figures

CONTROL MECHANISM FOR THE PULL-DOWN PAWL OF A FILM PROJECTOR

BACKGROUND OF THE INVENTION

The present invention relates to a control mechanism for the pull-down pawl of a film projector, for the projection of films with different frame frequencies, in which a control drum with a plurality of cam curves is provided for controlling the movement of the pull-down pawl into and out of perforations of the film.

Known constructions of such control mechanism require a relatively large space near the objective, especially if different frame frequencies have to be obtained. In addition, the transmission of the control movement from the control drum to the pull-down pawl causes considerable difficulties. If, as usual in the known constructions, the plurality of cam curves on the control drum are tracked by a transmission member, movable in axial direction of the control drum to be aligned with a selected one of the cam curves, then this movement of the transmission member in axial direction will produce, depending on position of the transmission member, a different control movement of the pull-down pawl. In order to assure a secure engagement of the pawl into the perforations of the film, a larger stroke is necessary when the transmission member engages a cam curve adjacent the pawl, then when the transmission member engages a cam curve which is located closer to the tilt bearing of the pull-down pawl. This transmission relationship between the control movement at the respective cam to the movement of the end of the pull-down pawl means into and out from the film perforations will also change the angle of inclination of the sections of the respective cam curve which serve to control the movement of the end of the pull-down pawl means. With the change of the aforementioned transmission relationship, the influence of the tolerances, at which the cam curves are produced, changes likewise. All these factors evidently make the production of the control drum considerably complicated, while the control mechanisms known in the art do not operate in a fully satisfactory manner.

SUMMARY OF THE INVENTION

It is an object of the present invention to provide a control mechanism for the pull-down pawl of a projector, for the projection of films with different frame frequencies, which avoids the disadvantages of such control mechanisms known in the art.

It is an additional object of the present invention to provide for a control mechanism of the aforementioned kind which is simple and compact in its construction, so that it requires relatively little space and may be produced at reasonable cost, while standing up properly under extended use.

With these and other objects in view, which will become apparent as the description proceeds, the control mechanism for the pull-down pawl means of a projector, for the projection of films with different frame frequencies, mainly comprises support means, a drive wheel mounted on the support wheel for rotation about its axis, a control drum for controlling the movement of the pawl into and out of the perforations of the film arranged coaxially with the drive wheel, a plurality of different cam curves extending axially displaced from each other about the periphery of the control drum, and means connecting the control drum with the drive wheel for rotation with the latter and movable in axial direction relative thereto, in which the drive wheel is formed with a recess extending in the direction of the axis and dimensioned to that the drum may be moved in axial direction into and out of the recess.

The drive wheel is preferably in form of a worm gear meshing with a worm which is driven by a shaft driving a shutter shaft of the projector and carrying a cam for controlling the stroke of the pull-down pawl to advance the film while the pawl is located in one of the film perforations.

According to a further feature of the present invention the drive wheel is pot-shaped and has an annular end face defining an open end of the recess and a pin mounted in the support means movable in the direction substantially normal to the axis of the drive wheel and the control drum is arranged closely adjacent the aforementioned end face and engaging with one end thereof a selected one of the cam curves brought in alignment with the pin upon movement of the control drum in axial direction, whereas the other end of the pin engages the pull-down pawl means to thus transmit the movement of the pin, imparted thereto by the respective cam curve during rotation of the drum, to the pull-down pawl means to move the latter into and out of the film perforations.

The novel features which are considered as characteristic for the invention are set fort in particular in the appended claims. The invention itself, however, both as to its own construction and its method of operation, together with additional objects and advantages thereof, will be best understood from the following description of specified embodiments when read in connection with the accompanying drawings.

DESCRIPTION OF THE PREFERRED EMBODIMENT

Figure 1:
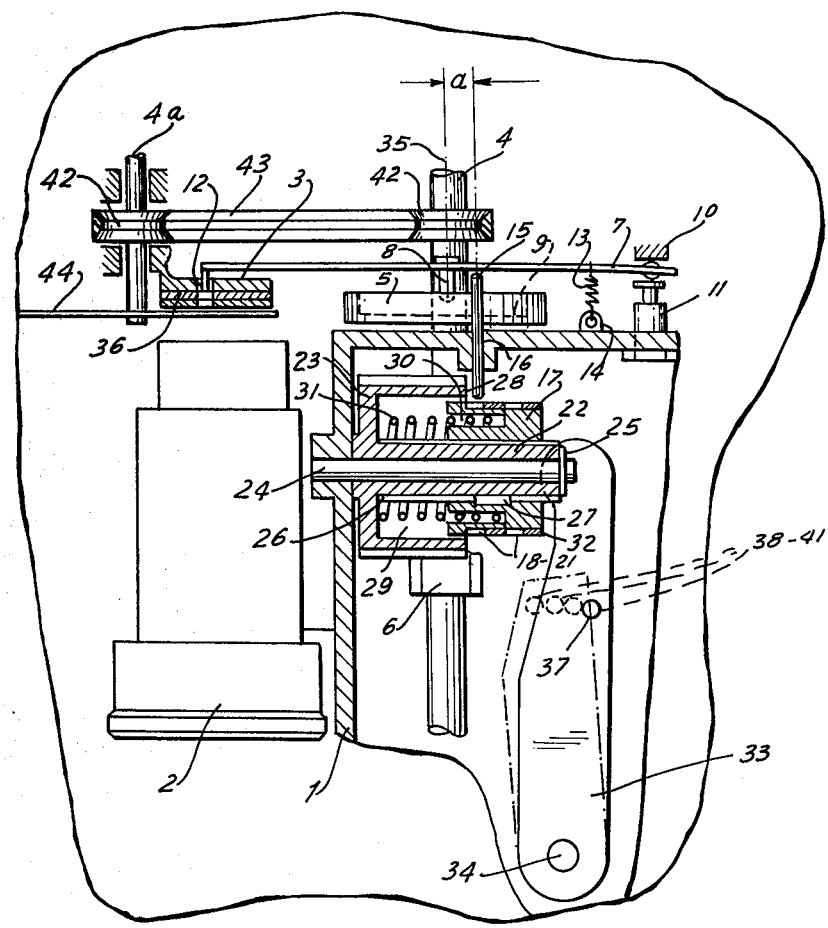
FIG. 1 is a partially sectioned side view of the control mechanism according to the present invention.

Referring now to the drawing and more specifically to FIG. 1 of the same, it will be seen that the control mechanism according to the present invention mainly comprises a housing or support means 1, only partially shown in FIG. 1, and carrying an objective 2, a film guide 3 guiding a film 36 for movement in longitudinal direction and a shaft 4 mounted for rotation about its axis in the support means 1. Mounted on the shaft 4 for rotation therewith is a cam 5 and axially spaced therefrom a worm 6. Pull-down pawl means are arranged for cooperation with the cam 5. The pull-down pawl means comprise a lever 7 having at one end a detent 12 adapted to engage into perforations of the film 36, while adjustable bearing means 10, 11 engage the other end of the lever for mounting the latter tiltably in two directions transverse to each other. The lever 7 carries intermediate its ends a cam follower or pin 8, which engages the cam curve 9 of the cam 5. A coil compression spring is connected at one end to the lever 7 between the pin or cam follower 8 and the tilt bearing 10, 11, whereas the other end of the spring 13 is mounted in an ear 14 integral with the housing 1. The coil spring 13 is arranged so as to maintain the pin or cam follower 8 in engagement with the cam curve 9 and to maintain also the lever 7 in engagement with the upper end of a pin 15 guided for reciprocating movement in direction parallel to the shaft 4 in an appropriate bore 16 of the housing 1.

The other end of the pin 15 is adapted to engage one of four different cam curves 18 – 21, which are provided on the periphery of a control drum 17, displaced from each other in axial direction of the latter. The control drum 17 is mounted on the hub 22 of a drive wheel 23, in form of a worm gear. Means are provided for connecting the control drum 17 with the drive wheel 23 for rotation with the latter and movable in axial direction relative thereto and such means are preferably in the form of a groove 26 in the hub of the worm gear 23 and a key 27 slidable in the groove 26 arranged in the bore of the control drum 17 and connected to the latter. The worm gear is pot-shaped, that is it is provided with a recess 29 extending from the end face 28 of the worm gear into the latter. The axial length of the recess 29 is such that the control drum 17 may be moved into the recess until the outermost of the cam curves 18 – 21 on the periphery of the control drum 17 is aligned with the pin 15. A coil compression spring 31 is arranged in the recess 29 and a corresponding annular recess in the control drum 17, to bias the latter in direction towards the right, as viewed in FIG. 1, so that its end face 32 is maintained in engagement with one end of a lever 33, the other end of which is pivotally mounted at 34 on the support means 1. The lever 33 is tiltable, by hand or by a mechanism, not shown in the drawing and not forming a part of the present invention, between a plurality of selected positions in which one end of the pin 15 is aligned with one of the cam curves 18 – 21, and the lever 33 is releasably held in any of the selected positions by an arrangement schematically indicated in FIG. 1 and comprising a plurality of semi-spherical cavities 38 – 41, equal in number to the cam curves 18 – 21, formed in the support means, in which a spring pressed spherical member 37 on the lever 33 may engage in any of the selected tilted positions of the lever.

The shaft 4 is driven by conventional means, not shown in the drawing, and rotation of the shaft 4 to the worm gear 23 is transmitted by the afore-mentioned worm 6 meshing with the worm gear 23. Thereby the worm gear 23 engages with the worm 6 only so much as is necessary for a proper transmission of the drive from the worm to the worm gear. From this necessary relationship will result the distance "a" of the axis of the pin 15, which is arranged closely adjacent to end face 28 of the worm gear, from the axis 35 of the shaft 4 and the axis of the cam follower 8. This distance "a" remains constant regardless to which frame frequency the control mechanism is adjusted.

Depending on which frame frequency the control mechanism should operate, the control drum 17 is moved by means of the lever 33 in axial direction on the hub 22 in such a manner that the cam curve corresponding to the desired frame frequency is located opposite the pin 15. Thereby, the maximum number of the depressions, best shown in FIGS. 2 and 3, of the respective cam curves can be chosen in such a manner that, any stroke of the pull-down cam means 7, 12 transmitted by the cam curve 9 of the cam 5 is correlated with a corresponding movement of the detent 12 in and out of the film perforations. In order to change the frame frequency it is only necessary to shift the control drum 17 in axial direction by means of the lever 33.

Figure 2:
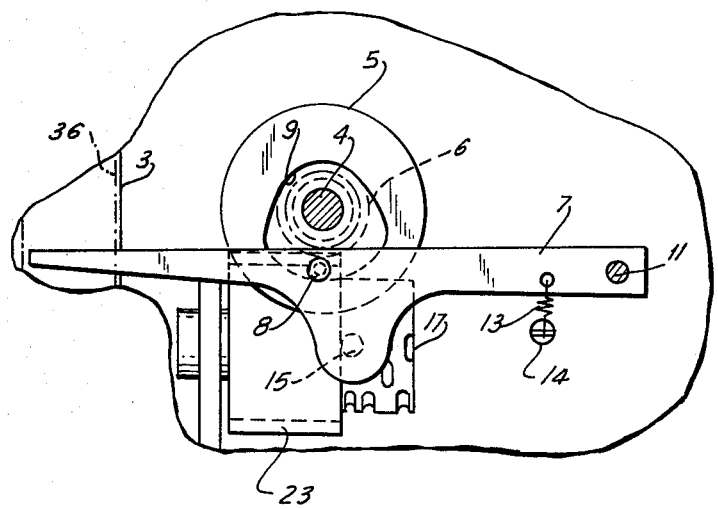
FIG. 2 is a partial top view of the arrangement shown in FIG. 1, with certain elements shown in FIG. 1 omitted for clarity's sake.
Figure 3:
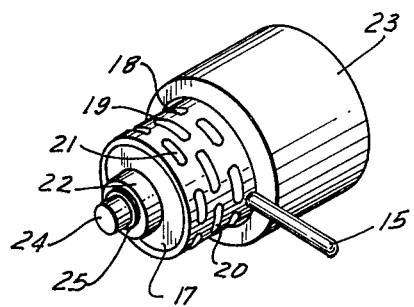
FIG. 3 is a partial perspective view of the control drum and the worm gear.

A shutter 44 of known construction is located between one end of the objective 2 and the film guide 3 and this shutter 44 is rotated by means of a shaft 4a extending parallel to the shaft 4 and turnably mounted in appropriate bearings, schematically illustrated in FIG. 1. A belt drive comprising a pair of pulleys 42, respectively mounted on the shafts 4 and 4a and an endless belt 43 transmits rotation of the shaft 4 to the shaft 4a. As shown in FIG. 2 the lever 7 is preferably provided with a lateral projection which is engaged by the upper end of the pin 15.

Since the control drum 17 is movable in axial direction partly into the recess 29 of the worm gear 23 the afore-mentioned distance "a" of the axis of the pin 15 from the axis 35 of the shaft 4 can be maintained constant and relatively small. Furthermore, due to the step-down transmission between the shaft 4 and the control drum 17, it is also possible to drive the shutter 44 in a simple manner from the shaft 4.

It will be understood that each of the elements described above, or two or more together, may also find a useful application in other types of control mechanism for the pull-down pawl of a projector for the projection of films of different frame frequencies differing from the types described above.

While the invention has been illustrated and described as embodied in a control mechanism for the pull-down pawl of a projector, for the projection of films of different frame frequencies, in which a control drum carrying a plurality of cam curves is connected to a drive wheel for rotation therewith and movable in axial direction relative thereto, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a control mechanism for the pull-down pawl means of a projector for the projection of films with different film frequencies, a combination comprising support means; a drive wheel mounted on said support means for rotation about its axis; a control drum coaxial with said drive wheel and arranged for controlling the movement of one end of the pull-down pawl means into and out of perforations in a film to be projected; a plurality of different cam curves extending axially displaced from each other about the periphery of said control drum; and means connecting said control drum with said drive wheel for rotation with the latter and movable in axial direction relative thereto, said drive wheel being formed with a recess extending in the direction of said axis and dimensioned so that said control drum may be moved in axial direction into and out of said recess.

2. A combination as defined in claim 1, wherein said drive wheel is a worm gear, and including a driven shaft, a worm coaxially fixed to said driven shaft and meshing with said worm gear, and a cam coaxially fixed to said shaft for controlling the stroke of the pull-down pawl means to advance the film while the one end of said pull-down pawl means is located in one of the perforations of the film.

3. A combination as defined in claim 2, wherein said drive wheel is pot-shaped and having an annular end face defining an open end of said recess.

4. A combination as defined in claim 3 and including a pin mounted in said support means movable in direction substantially normal to said axis closely adjacent said end face, said pin having one end engaging a selected one of said cam curves, brought in alignment with said pin upon movement of said control drum in axial direction, the other end of said pin engaging said pull-down pawl means to transmit the movement of the pin, imparted thereto by the respective cam curve during rotation of said drum, to said pull-down pawl means to move the one end of the latter into and out of the perforations of the film.

5. A combination as defined in claim 1, wherein said drive wheel has a central hub extending through a central bore in said control drum, and wherein said means for connecting said drum to said drive wheel comprise a groove provided in the peripheral surface of said hub and extending in the direction of said axis, and a sliding key fixed to said drum and engaged in said groove.

6. A combination as defined in claim 1, and including biasing means for biasing said drum in a direction out of said recess, and means cooperating with said drum for holding the latter against the force of said biasing means in a predetermined axial position relative to said drive wheel.

7. A combination as defined in claim 6, wherein said biasing means comprises a compresssion spring arranged in said recess and engaging said drum on one end thereof, and wherein said holding means comprise a lever tiltably mounted at one end on said support means and engaging with the other end thereof said drum on the opposite end of the latter, and means for releasably holding said lever in one of a plurality of tilted positions.

8. A combination as defined in claim 4, wherein said pull-down pawl means is constituted by a lever having at said one end a detent adapted to engage into perforations of said film and including bearing means on said support means and mounting the other end of said lever tiltable in a plane parallel to said axis and transverse thereto.

9. A combination as defined in claim 8, wherein said cam on said shaft has an annular cam curve having a generatrix extending normal to said axis and including a cam follower fixed to said lever intermediate the ends thereof and engaging said annular cam curve on said cam.

10. A combination as defined in claim 9 and including spring means connected at opposite ends to said lever and said support means for maintaining said cam follower in engagement with said annular cam curve and said one end of said pin in engagement with a selected cam curve on said drum.

11. A combination as defined in claim 10, and including an objective, a film guide adjacent one end of said objective, a rotatable shutter between said film guide and said one end of said objective, a shutter shaft carrying said shutter for rotation, and transmission means between said driven shaft and said shutter shaft.

12. A combination as defined in claim 11, wherein said shutter shaft extends parallel to said driven shaft, and wherein said transmission means comprise a belt drive between said driven shaft and said shutter shaft.

* * * * *